United States Patent [19]

Symons

[11] Patent Number: 5,258,087
[45] Date of Patent: Nov. 2, 1993

[54] METHOD OF MAKING A COMPOSITE STRUCTURE

[75] Inventor: Michael W. Symons, Transvaal, South Africa

[73] Assignee: Plascon Technologies (Proprietary) Limited, Johannesburg, South Africa

[21] Appl. No.: 851,279

[22] Filed: Mar. 13, 1992

Related U.S. Application Data

[63] Continuation of Ser. No. 499,637, Mar. 27, 1990, abandoned.

[30] Foreign Application Priority Data

| Mar. 28, 1989 | [ZA] | South Africa | 89/2253 |
| Aug. 21, 1989 | [ZA] | South Africa | 89/6347 |
| Jan. 15, 1990 | [ZA] | South Africa | 90/0250 |

[51] Int. Cl.$^5$ .......................................... B32B 31/12
[52] U.S. Cl. ................................ 156/210; 156/305; 156/307.3; 156/307.4; 428/182
[58] Field of Search .................... 156/210, 205, 307.3, 156/307.4, 305; 428/182

[56] References Cited

U.S. PATENT DOCUMENTS

| 2,454,719 | 11/1948 | Scogland . | |
| 3,214,324 | 10/1965 | Peerman | 156/307.3 X |
| 3,530,021 | 9/1970 | Reichl . | |
| 3,619,342 | 11/1971 | Burke . | |
| 3,673,031 | 6/1972 | Moilanen | 156/210 X |
| 3,691,002 | 9/1972 | Blandy | 156/210 X |
| 4,096,305 | 6/1978 | Wilkinson et al. | 156/210 X |
| 4,409,274 | 10/1983 | Chaplin et al. | 156/210 X |
| 4,457,800 | 7/1984 | Schure et al. | 156/307.3 |
| 4,623,412 | 11/1986 | Bohme et al. | 156/210 |

FOREIGN PATENT DOCUMENTS

| 0342768 | 11/1989 | European Pat. Off. . |
| 1504196 | 6/1969 | Fed. Rep. of Germany . |
| 1813980 | 7/1969 | Fed. Rep. of Germany . |

OTHER PUBLICATIONS

Hackh's Chemical Dictionary, fourth edition, McGraw-Hill, 1969, p. 259.

Primary Examiner—Michael W. Ball
Assistant Examiner—Michele K. Yoder
Attorney, Agent, or Firm—Cushman, Darby & Cushman

[57] ABSTRACT

A method of making a composite structure from two first sheets of a natural fibre material such as paper and a second corrugated sheet of a natural fibre material such as paper, the second sheet being sandwiched between the two first sheets, includes the steps of impregnating the sheets with a liquid composition comprising a thermosetting resin such as a phenolic resin, an extending liquid for the thermosetting resin and a catalyst for the thermosetting resin, locating the second sheet between the two first sheets and polymerising the thermosetting resin to join the second sheet to the two first sheets to form the composite structure. The composite structure is of use in the building and packaging industry.

9 Claims, 1 Drawing Sheet

METHOD OF MAKING A COMPOSITE STRUCTURE

This is a continuation of application Ser. No. 07/499,637, filed on Mar. 27, 1990, which was abandoned upon the filing hereof.

BACKGROUND OF THE INVENTION

This invention relates to a method of making a composite structure from three or more sheets of a natural fibre material such as paper or cardboard, and to the composite structure so formed.

Composite or laminate structures consisting of two or more sheets of various types of materials joined together are well known. These composite structures are widely used in the building industry, the packaging industry, the furniture industry and the like. Although many types of such composite structure are known and used, there is always a need for new composite structures and new methods of making such composite structures.

SUMMARY OF THE INVENTION

According to the invention there is provided a method of making a composite structure comprising two or more first sheets of a natural fibre material and one or more second corrugated sheets of a natural fibre material, the or each second corrugated sheet being sandwiched between two adjacent first sheets, including the steps of:

(1) impregnating the first and second sheets with a liquid composition comprising a thermosetting resin, an extending liquid for the thermosetting resin and a catalyst for the thermosetting resin;

(2) locating the or each second corrugated sheet between two adjacent first sheets; and (3) polymerising the thermosetting resin to join the or each second corrugated sheet to the first sheets to form the composite structure.

The composite structure, in its simplest form, may comprise two first sheets with a single second corrugated sheet sandwiched between them. Alternatively, the composite structure may comprise three or more first sheets and two or more second corrugated sheets, each second corrugated sheet being sandwiched between two adjacent first sheets. Preferably, the two or more second corrugated sheets are arranged so that the corrugations or flutes of the two or more second sheets in the composite structure are all substantially parallel to one another.

The first sheets are made of a natural fibre material such as paper (including paper made from wood pulp, flax, bagasse, wood veneer or woven cloth, straw, jute, rags, and the like), paper pulp, cardboard, hardboard, chipboard, plywood, wood veneer or woven cloth, or the like.

The second sheet or sheets are also made of a natural fibre material, preferably paper or cardboard. The second sheet or sheets are corrugated.

The two or more first sheets may be made of the same natural fibre material, e.g. the first sheets may all be made of paper. Alternatively, the two or more first sheets may be made of different natural fibre materials, e.g. one of the first sheets may be a sheet of paper while another of the first sheets may be a sheet of hardwood. Likewise, when the composite structure includes two or more second corrugated sheets, the two or more second corrugated sheets may be made of the same natural fibre material or may be made of different natural fibre materials.

In step (3) of the method of the invention, the thermosetting resin is polymerised by subjecting the product of step (2), i.e. the sandwich of the first and second sheets, to suitable conditions of temperature and pressure to cause polymerisation. For example, the product of step (2) may be located in a suitable press between a pair of heated platens which press the first and second sheets together and cause polymerisation of the thermosetting resin to form the composite structure.

After step (3) of the method of the invention, the composite structure may be further treated in various ways. For example, further sheets of material may be attached to the outer surfaces of the composite structure, such material comprising for example fibre glass or aluminum foil sheets or the like. Alternatively, the outer surfaces of the composite structure may be coated with a suitable coating or may be printed to produce a decorative pattern. Further, the spaces between the corrugations or flutes of the second sheet or sheets of the composite structure may be filled with a suitable material such as a foam or a cement or the like.

In step (2) of the method of the invention, the first sheet and the second sheets are impregnated with a liquid composition comprising firstly a thermosetting resin, secondly an extending liquid for the thermosetting resin and thirdly a catalyst for the thermosetting resin.

The thermosetting resin may be for example a phenolic resin in which case the extending liquid may be water, a $C_1$-$C_4$ alcohol, a higher carbon alcohol such as furfuryl alcohol, acetone or methylethyl ketone, and the catalyst may be a suitable acidic catalyst for phenolic resins.

The thermosetting resin may also be a polyester resin or an epoxy resin in which case the extending liquid may be a halogenated hydrocarbon such as dichloromethane, fluorotrichloromethane, trichlorotrifluoroethane, trichloroethylene or perchloroethylene, benzyl alcohol, nonylphenol, dibutyl phthalate, xylene, and methylethyl ketone, and the catalyst may be any suitable latent catalyst for a polyester or epoxy resin.

The thermosetting resin may also be an acrylic or methacrylic acid ester resin, a formaldehyde resin such as a urea or a melamine formaldehyde resin, and the like.

There are two preferred liquid compositions according to the invention. The first preferred liquid composition comprises a phenolic resin, 20-100% by weight of the resin of an extending liquid which is a $C_1$ to $C_4$ alcohol, i.e. methanol, ethanol, propanol or butanol, and a catalyst for the phenolic resin.

The second preferred liquid composition of the invention comprises a polyester resin or an epoxy resin, 20-100% by weight of the resin of an extending liquid selected from dichloromethane, trichloroethylene, perchloroethylene, trichlorobromine, trichlorotrifluoroethane and fluorotrichloromethane, and a latent catalyst for the resin.

The liquid composition of the invention may also contain other components such as an inhibitor, an accelerator, a surfactant, extending particles such as silica fume, and the like.

In step (2) of the method of the invention, the first sheets and the second sheet or sheets may be impregnated in any suitable manner. Preferably the impregnation is carried out under pressure.

According to a second aspect of the invention, there is provided a composite structure made by the method set out above.

The composite structure of the invention has many uses in the building industry, the packaging industry, the furniture industry, and the like.

DESCRIPTION OF EMBODIMENTS

Figure 1:
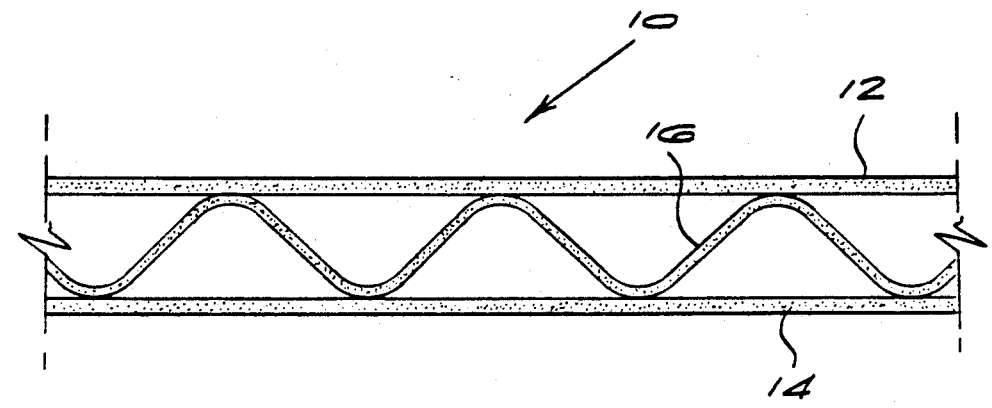
FIG. 1 is a cross-sectional view of a first composite structure according to the invention.

The present invention relates to a method of making a composite structure comprising two or more first sheets of a natural fibre material and one or more second corrugated sheets of a natural fibre material, the or each second corrugated sheet being sandwiched between two adjacent first sheets. The crux of the method of the invention is that the first sheets and second sheet or sheets are impregnated with a liquid composition comprising a thermosetting resin, an extending liquid for the thermosetting resin and a catalyst for the thermosetting resin, prior to being assembled and joined to one another. Once the sheets have been impregnated, the or each second sheet is located between two adjacent first sheets and the thermosetting resin is polymerised to make the first and second sheets rigid and to join the or each second sheet to the first sheets to form the composite structure.

The first sheets comprise a natural fibre material. Suitable natural fibre materials include paper (made from wood pulp, flax, bagasse, straw, papyrus, bamboo, jute, rags, and any other suitable natural fibrous material), paper pulp, hardboard, chipboard, plywood, wood veneer and woven cloth.

Each first sheet may comprise a single sheet of a natural fibre material or may comprise two or more sheets of a natural fibre material joined to one another in any suitable manner.

The second sheet or sheets are also made of a natural fibre material, preferably a paper or a cardboard. The second sheet or sheets are corrugated along their length prior to use in any suitable manner.

The first sheets in a particular composite structure need not all be made of the same natural fibre material, and likewise, where a composite structure includes two or more second sheets, the second sheets need not all be made of the same natural fibre material. Thus for example, a composite structure may comprise a first sheet of a paper material, a second corrugated sheet of a paper material, and a further first sheet of chipboard, joined to one another to form the composite structure.

In step (1) of the method of the invention, the first sheets and the second sheet or sheets are impregnated with a liquid composition. The liquid composition comprises a thermosetting resin, an extending liquid for the thermosetting resin and a catalyst for the thermosetting resin. Examples of various types of liquid composition for use in the method of invention are given below.

It is desirable that the pre-catalysed thermosetting resin has an extended pot life, i.e. the period of time during which no significant viscosity change occurs in the resin mix. A pot life of 14–25 days is desirable. This may be achieved by suitable selection of the thermosetting resin and the extending liquid and the catalyst. The thermosetting resin, once pre-catalysed, may also be kept at a low temperature, for example below 10° C. to extend the pot life.

The extending liquid has other important functions which are to provide variability as to the weight of the resin to be impregnated into the first and second sheets, to control resin viscosity, not to interfere with polymerisation and to be easily recovered from the impregnated material.

The thermosetting resin may be a phenolic resin (phenol formaldehyde resin) preferably a liquid phenolic resin which can be polymerised at room temperature or elevated temperature. Examples of suitable phenolic resins include:

Polylam 2432 from National Chemical Products Limited of Germiston, South Africa, which is a liquid phenolic resin designed to cure at room temperature with an acidic catalyst such as a blend of sulfonic acids such as Catalyst VX-21 of National Chemical Products Limited;

Cellobond J2027L, J2018L, J20/1096L and J20/1081L from British Petroleum Company plc, which may be catalysed with a catalyst such as Phencat 10, Phencat 15, or the VCM90 from British Petroleum Company plc or VX-21 from National Chemical Products Limited;

A phenol-furfural resin catalysed with hexamethylene tetramine;

A blend of a phenolic resin with a melamine formaldehyde or a urea formaldehyde resin.

Suitable extending liquids for use with phenolic resins may be either solvents of the resin or low viscosity diluents and may be either reactive or non-reactive. Typical examples include water; $C_1C_4$ alcohols such as methanol, ethanol, propanol and butanol; higher carbon alcohols such as furfuryl alcohol; acetone; and methylethyl ketone.

The thermosetting resin may also be an epoxy resin. The preferred epoxy resins are typically low viscosity liquid epoxide resins manufactured from epichlorohydrin and bisphenol F. Typical examples of such resins include those manufactured by Shell Chemical Company under the names Epikote 816, 862, 232, 235 and 236 and those manufactured by Ciba Geigy AG under the names XD.4150, XSA.214, Araldite, AZ.15 and Araldite PY.340-2. Other suitable epoxy resins include epoxy resins with blocked amine functions, such as the reaction product of phthalic anhydride with diethylene triamine.

Suitable latent catalyst systems for use with epoxy resins include those catalyst systems supplied by Anchor Chemicals (UK) Limited such as Ancamine 2014S which is a modified polyamine; Anchor/catalyst 1786B which is a 50/50 solution of p-toluene sulphonate of 2-amino-2-methyl-1-propanol in n-butanol; Anchor/catalyst S.475 which is a 50/50 solution of morpholinium-p-toluene sulphonate in ethylene glycol monoethyl ether; Anchor/catalyst K.61B; Ancamide 2066; boron trifluoride based catalysts include Anchor 117, 1171, 1222, 1040 and 1115 which consist of chemically modified amine complexes of boron trifluoride; Ancamine 1482 which is a liquid eutectic blend of aromatic amines; Ancamine SRX which is an aromatic polyamine; Anacamine SP which is a diamino diphenyl sulphone; and the like. These catalysts generally trigger polymerisation at a temperature of around 80° C. or upwards.

Suitable extending liquids for use with epoxy resins include halogenated hydrocarbons such dichloromethane, trichloroethane, carbon tetrachloride, chloroform, trichlorofluoromethane, perchloroethylene, trichloroethylene, trichlorofluoromethane and trichlorotrifluoroethane; xylene; methylethyl ketone; butyl glycidyl ether; cresyl; glycidyl ether; p-tert-butyl glycidyl ether; glycidyl ethers of $C_8$–$C_{14}$ alcohols; butane diol glycidyl ether; and acetone.

The thermosetting resin may also be a liquid polyester resin such as the unsaturated isophthalic or orthophthalic liquid polyester resins. Examples of these are those manufactured by Scott Bader of England including Crystic 272 catalysed by catalyst powder B and Crystic 196, and those under the Atlac brand by DSM.

Other suitable polyester resins are those produced by National Chemical Products, Germiston, South Africa, such as Polylite 33410, Polylite 8130, Polylite 8000 and Polylite 8382X. Suitable latent catalysts for these resins include di-tert-butyl peroxy 3.3.5 tri-methylcyclohexane in dibutyl phthalate such as those sold by Akzo Chemie under the name Triganox 29B240, Lucidol KL50, Triganox 21, Triganox C or Triganox K-70, benzoyl peroxide formulations, t-butyl perbenzoate sold by Interox under codes TBTB and TBPB, dibenzoyl peroxide sold by Interox under code Interox BP.50-FT or methyl isobutyl ketone peroxide sold by Interox under code MIKP NA1. These catalysts generally trigger polymerisation at a temperature in the region of 60° C. upwards, more tyupically 80° C. upwards.

Suitable extending liquids for use with polyester resins include halogenated hydrocarbons such as dichloromethane, trichloroethylene, perchloroethylene, trichlorobromine, trichloroethane, trichlorotrifluoroethane, carbon tetrachloride, chloroform and trichlorofluoromethane; toluol; xylene; butyl acetate; cyclohexane; benzene; tetrahydrofuran; acetone and methylethyl ketone.

Another type of thermosetting resin which may be used are the liquid room temperature curing acrylic and methacrylic acid esters and methyl methacrylates, typically catalysed with benzoyl peroxide powders; and urea formaldehyde and melamine formaldehyde resins catalysed with acids, and which may have been internally plasticised with glycols.

The liquid composition for use in the method of the invention may also include other components such as an inhibitor, an accelerator, a surfactant, e.g. a sulfosuccinate for use with phenolic resins or an alkyl aryl sulphonate for use with polyester or epoxy resins, and extending particles such silica fume, micronised corundum, borosilicate and silicon dioxide.

There are two particularly preferred liquid compositions for the use in the method of the invention. These liquid compositions are preferred because they have optimal pot life, they provide for suitable levels of impregnation of the resin into the materials to be impregnated, they provide for easy polymerisation of the thermosetting resin once impregnated, and the extending liquid is easily recovered.

The first preferred liquid composition of the invention comprises a phenolic resin, 20–100% by weight of the phenolic resin of an extending liquid which is a $C_1$–$C_4$ alcohol, i.e. methanol, ethanol, propanol or butanol, preferably methanol, and a catalyst for the phenolic resin, preferably an acidic catalyst such as a blend of an organic acid, e.g. a sulphonic acid and an inorganic acid, e.g. phosphoric or sulphuric acid.

The second preferred liquid composition of the invention comprises a polyester resin or an epoxy resin, 20–100% by weight of the resin of an extending liquid which is selected from dichloromethane, trichloroethylene, perchloroethylene, trichlorotrifluoroethane and fluorotrichloromethane, trichlorobromine, and a suitable catalyst such as t-butyl perbenzoate.

The first and second sheets may be impregnated with the liquid composition in any suitable manner. One suitable method will now be described.

The sheets to be impregnated are placed in a pressure vessel which is connected to a vacuum pump. The sheets are then subjected to a high vacuum for the purpose of exhausting all free air and gases from the sheets, both intracellular and extracellular. The liquid composition of the invention is then introduced into the pressure vessel. When the pressure vessel is filled with the liquid composition, pressure is applied either by introducing compressed air into the pressure vessel or hydraulically to cause the liquid composition to penetrate the sheets. The duration of the pressure cycle and the pressure itself depends on the nature of the liquid composition and the nature of the sheets. Once the sheets are suitably impregnated, the unused resin is removed from the pressure vessel and the pressure in the vessel is released. This pressure release causes vaporisation of the extending liquid which may be recovered and condensed for future use which may be followed by the imposition of a vacuum, and also serves to promote draining of excess resin. The impregnated sheets are then removed from the pressure vessel. Thereafter, the impregnated sheets are passed to the second step of the method of the invention.

In step (2) of the method of the invention, the first and second sheets are assembled. When the composite structure is to consist of two first sheets with a single second sheet sandwiched therebetween, the three sheets are assembled in this order. When the composite structure is to consist of multiples of first and second sheets, the structure is assembled by locating each second sheet between two adjacent first sheets.

In step (3) of the method of the invention, the thermosetting resin is polymerised to join the or each second sheet to its adjacent first sheets to form the composite structure. Any suitable method of polymerisation may be employed.

One suitable method of polymerisation comprises locating the product of step (2) between the heated platens of a suitable press and then applying heat and pressure to cause polymerisation of the thermosetting resin and joining of the first sheets to the second sheet or sheets.

Alternative methods may be used where the thermosetting resin is designed to polymerise at room temperature.

Once the composite structure has been formed, it may be further treated. For example, the spaces between the corrugations of the second sheet or sheets may be filled with a suitable material such as a fine polymer concrete, or a foam material.

The outer surfaces of the composite structure may also be treated, for example by laminating a further sheet of a suitable material to the outer surfaces, e.g. a sheet of fiberglass or thin metal such as aluminium or a sheet of a fibrous material. The outer surfaces of the composite structure may also be coated, printed or otherwise patterned in a conventional manner.

Examples of composite structures of the invention will now be given with reference to the accompanying drawings.

Referring to FIG. 1 of the accompanying drawings, there is shown a first example of a composite structure according to the invention. The composite structure 10 consists of a first sheet 12, a first sheet 14 and sandwiched therebetween a second corrugated sheet 16. The first sheets 12, 14 both comprise sheets of kraft paper while the second sheet 16 comprises cardboard. The three sheets 12, 14, 16 were impregnated with a liquid composition comprising a phenolic resin, methanol and an acidic catalyst for the phenolic resin. The three sheets 12, 14, 16 were then assembled as shown and located between the heated platens of a press. This resulted in polymerisation of the phenolic resin which caused the second sheet 16 to be joined to the first sheets 12, 14 to form the composite structure 10.

Figure 2:
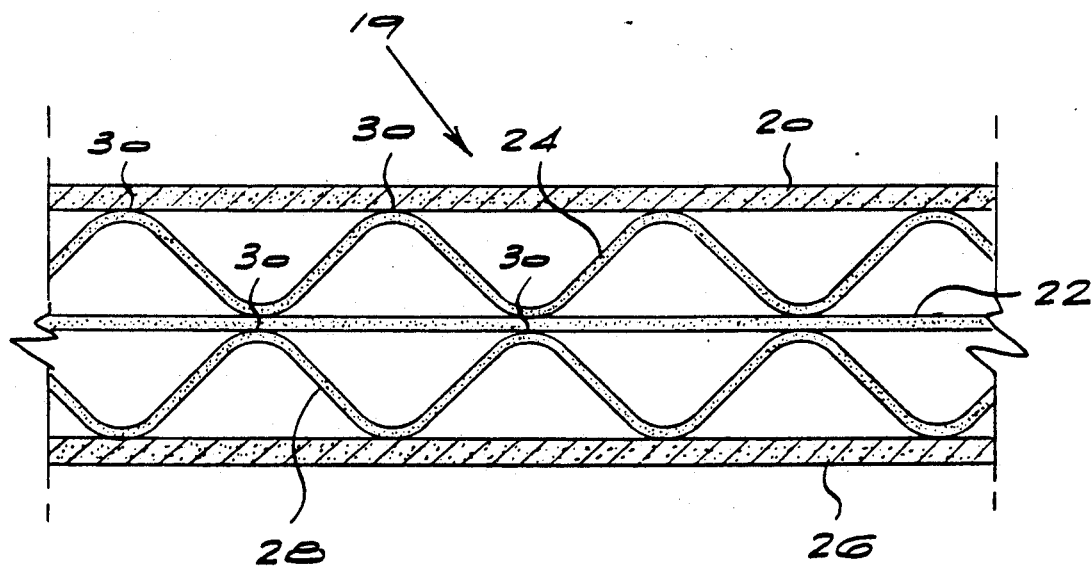
FIG. 2 is a cross-sectional view of a second composite structure according to the invention.

Referring to FIG. 2 of the accompanying drawings, there is shown a second example of a composite structure 19 according to the invention which consists of a first sheet 20 and a first sheet 22 with a second sheet 24 sandwiched therebetween, and a further first sheet 26 with a further second sheet 28 sandwiched between the sheets 22 and 26. It is to be noted that the flutes or corrugations 30 of the two second sheets 24, 28 are substantially parallel to one another which provides the composite structure 19 with extra rigidity. The first sheets 20, 26 both comprise sheets of chipboard and the first sheet 22 comprises a sheet of paper. The second sheets 24, 28 comprise sheets of cardboard. All the sheets 20, 22, 24, 26, 28 were impregnated with a liquid composition comprising a polyester resin, dichloromethane and a catalyst for the polyester resin. The sheets 20, 22, 24, 26, 28 were then assembled as shown and located between the heated platens of a press. This resulted in polymerisation of the polyester resin which caused the second sheets 24, 28 to be joined to the first sheets 20, 22, 26 to form the composite structure 19.

The composite structure of the invention has the advantages of rigidity, dimensional stability, resistance to sagging and distortion and at the same time is light.

The composite structure of the invention may be used as building or cladding panel, as a packaging material, for the construction of furniture such as shelving, as shutter boards for concrete casting, and the like.

I claim:

1. A method of making a composite structure comprising two or more first sheets of a natural fibre material and one or more second corrugated sheets of a natural fibre material, the or each second corrugated sheet being sandwiched between two adjacent first sheets, includes the steps of:
    (1) impregnating the first and second sheets with a liquid composition comprising a thermosetting resin, a nonreactive extending liquid for the thermosetting resin and a catalyst for the thermosetting resin, said liquid composition being selected from the group consisting of (a) a phenolic resin, 20-100% by weight of the phenolic resin of a $C_1$—$C_4$ alcohol and catalyst for phenolic resin, and (b) a polyester resin or an epoxy resin, 20-100% by weight of the resin of an extending liquid selected from the group consisting of dichloromethane, trichloroethylene, perchloroethylene, trichlorobromine, fluorotrichloromethane and trichlorotrifluoroethane and a catalyst for the resin;
    (2) locating the or each second corrugated sheet between two adjacent first sheets;
    (3) after step 2 recovering the extending liquid; and
    (4) after step 3 polymerizing the thermosetting resin to join the or each second corrugated sheet to the first sheets to form the composite structure.

2. A method according to claim 1 wherein the composite structure comprises two first sheets with a second corrugated sheet sandwiched between them.

3. A method according to claim 1 wherein the composite structure comprises three or more first sheets and two or more second corrugated sheets, each second corrugated sheet being sandwiched between two adjacent first sheets, with the corrugations of the two or more second sheets being substantially parallel to one another.

4. A method according to claim 1 wherein the first sheets are selected from the group consisting of sheets of paper, paper pulp, cardboard, hardboard, chipboard, plywood, wood veneer and woven cloth.

5. A method according to claim 1 wherein the two or more first sheets are made of the same natural fibre material.

6. A method according to claim 1 wherein the two or more first sheets are made of different natural fibre materials.

7. A method according to claim 1 wherein the second sheet or sheets are selected from the group consisting of sheets of paper and cardboard.

8. A method according to claim 1 wherein in step (4) the thermosetting resin is polymerised by subjecting the product of step (2) to suitable conditions of temperature and pressure.

9. A method according to claim 8 wherein in step (4) the product of step (2) is located in a press between a pair of heated platens to cause polymerisation of the thermosetting resin.

* * * * *